UNITED STATES PATENT OFFICE.

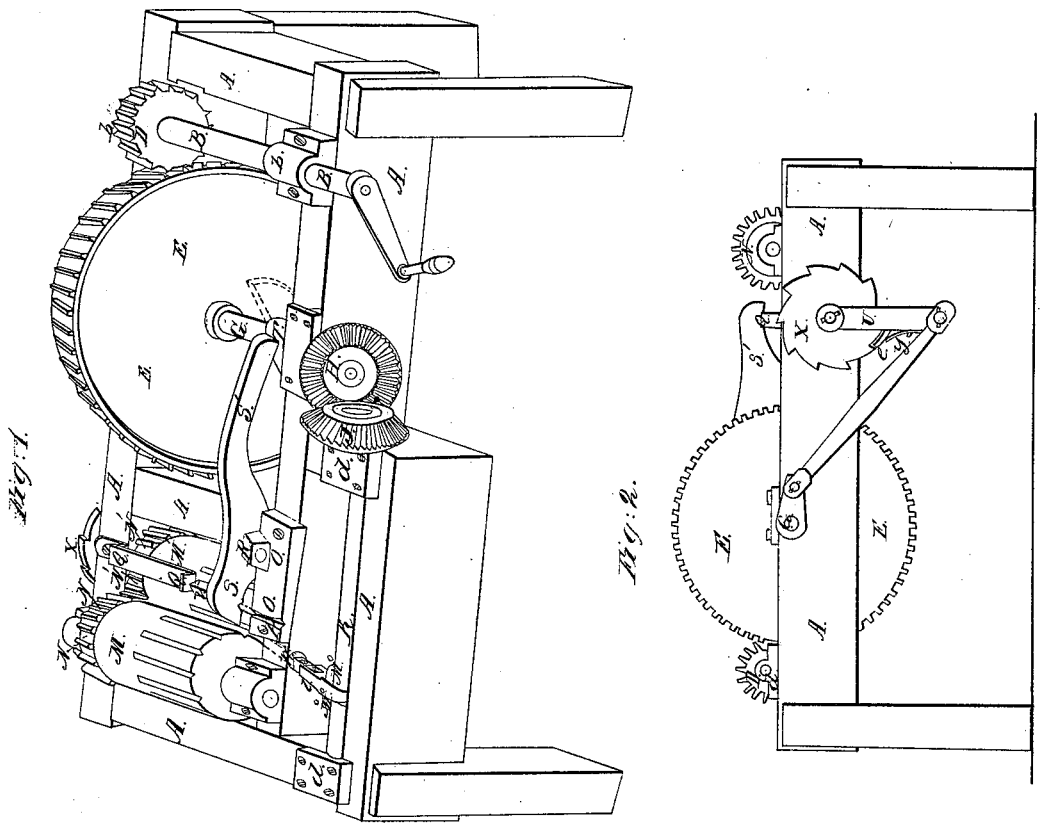

E. B. WHITE, OF NASHUA, NEW HAMPSHIRE.

DOUBLE-CYLINDER SPIKE-MACHINE.

Specification of Letters Patent No. 6,803, dated October 16, 1849.

*To all whom it may concern:*

Be it known that I, E. B. WHITE, of Nashua, county of Hillsboro, State of New Hampshire, have invented an Improved Machine for the Manufacture of Iron Spikes; and I hereby declare the following to be a full and exact description of the same, reference being had to the annexed drawings, which make a part of this specification.

This is a machine for the purpose of forming, cutting and heading rivets of different thicknesses and lengths, of heated bar iron. The pointing of the rivets is not contemplated, as this part of the manufacture is afterward accomplished by hand labor.

Figure 1, is a perspective view of my invention, affording a view of the general arrangement and combination of the parts of machinery employed.

A, A, is the frame which supports the machine.

B, B, is the driving shaft turning in bearings $b$, $b$, fixed to the frame. On one end of the shaft pulleys may be placed for driving belts, and is here represented by a crank handle to correspond with the model.

D is a spur wheel fixed to the shaft B B, the cogs of which work in the large cog wheel E, E.

G is a shaft, and the axle of E, E, and turns on bearings in the frame A, A. Upon one end of the shaft G there is a beveled cog wheel H which works in a beveled cog wheel J at right angles to it; and upon the other end there is a crank not seen in this drawing but shown in Fig. 2. The wheel J is fixed on the end of the longitudinal shaft K, which turns on bearings $d$, $d$, fixed in the frame A, A.

So far, the arrangement merely produces the capability of revolving the shafts referred to, by the action of cog wheels working in each other. But the parts attached to the two shafts B B and K give action to the contrivances which constitute the features of my invention. The description of them may be divided into three parts. 1st the cylinders which contain the dies and their action upon each other. 2d the mode of cutting the bars of heated iron to the lengths corresponding with the dies. 3d the mode of heading the spikes.

M, M', are two solid cylinders fixed on axles, the journals of which turn on bearings fixed to the frame A, A, on the periphery of each of these cylinders there are a set of grooves or incisions of a dovetail form to admit of dies being inserted in them, each of the form and size of one half the dimensions of one of the spikes. These dies are shaped, and arranged upon the cylinders that when the latter revolve in opposite directions the dies meet and coincide so as to form a space in their interior equal to the form and dimensions of the spikes to be manufactured. On one end of each of the cylinders there is a cog wheel N, N', contrived and arranged so as to work in each other. The journal of the axle of M' is extended beyond the frame to receive a ratchet wheel which is fixed to it; part of the ratchet wheel is seen in this drawing, figured X, and the full view is shown in Fig. 2. Upon this journal of the axle of M' and close up to the outside of the ratchet wheel there is a crank, U see Fig. 2 the upper end of which turns loosely with a collar around the journal and is held in its position by a pin which passes through the journal and close up to the end of the collar. To the lower end of this crank one end of a connecting rod is attached and the other end of the latter is connected to a crank fixed on the end of the axle G of the wheel E E see Fig. 2. Thus the axle of the cylinder M' is connected to the axle of the cog wheel E E by two cranks and a connecting rod; but as the crank on the journal of the axle of M' turns loosely on a collar, no motion could be given to M' without the intervention of other means. This I effect by attaching to the lower end of the crank U which is fixed on the journal of the axle of M' a claw $e$ one end of it secured to a shoulder of the crank and the other bearing upon the teeth of the ratchet wheel; and this claw is kept up to the periphery of the ratchet wheel by a spring Y, (see Fig. 2) the lower end of the spring being screwed to the shoulder of the crank. If the driving shaft B and spur wheel D be put in motion the shaft G of the cog wheel E, E, is turned, which moves the crank upon its end, and the connecting rod attached to it; the reciprocating motion of the latter gives a corresponding movement to the crank U and to the claw which is secured to it. When the motion of the connecting rod is forward, the claw slides back and over the teeth of the ratchet wheel, and when the connecting rod is drawn back by the action of the crank upon G, the claw falls into one of the indentations on the periphery of the ratchet wheel so as to lock against one of the teeth and consequently move the ratchet wheel around in proportion to the length of the crank upon the axle G; now as the ratchet wheel X is fixed on the journal of the axle of M' the cylinder M' is turned, and the cog wheel N' acting upon the cog wheel N, a revolving motion is given to the cylinder M. Thus we obtain for the cylinders rest and motion alternately, the object of which is afterward explained.

Having explained the dies on the peripheries of the two cylinders and the action of the latter, we now proceed to show the manner of introducing the bar iron to the machine and the mode of cutting it in lengths corresponding with the length of the dies.

O, O, Fig. 1, is a block of iron screwed and firmly bedded on the frame A, A.

P, is a groove or channel cut on the top face of it, and is the guide by which the heated bar iron is introduced till the end of the latter meets a stop Q which is arranged so as to be over the ends of the dies when the cylinder M' revolves. This stop Q is a piece of thick sheet iron one end of it screwed to the farther side of the frame A, A, and the other turned up so as to form the stop. It is also bent between its extremities so as to be out of the way of the cylinder M'.

R is a block of iron forming part of O O, or firmly attached to it, in which a strong pin or short axle is fixed projecting inward and which forms a center or fulcrum for the shear S, S' to turn, in the manner of a lever upon a fulcrum. The end S is notched on the underside so as to form a blade for cutting and so placed as to adjoin and correspond with the end of the guide P, when the end S descends; the other end S' which is the heavier rests upon a cam T fixed on the axle G. The form of this cam is shown by dotted lines.

On the inner face of the end S of the shear there is a piece of strong metal V, triangular in its section, its length reaching to the stop Q, and firmly bolted and secured to the shear. This piece V presses the heated bar iron to the dies of the cylinder M' as the end S of the shear descends.

It will now be perceived that as the shaft G is turned the cam revolves and raises or lowers the end S' of the shear which rests upon it, and consequently depresses or lets rise the cutting end S, and as this latter rides against the inner side of the guide P, cuts off the bar iron which is introduced, on every descent of this end of the shear.

In the view shown by Fig. 1, the end S of the shear is raised and the dies on the cylinder M' are so arranged, that in this position of the shear one of them is in line with the guide P. If a bar of heated iron be now introduced and the machine be in motion, the end S of the shear descends with the piece V and the latter presses the bar iron into the die underneath. At this stage of the operation the straight edge of the cam is vertical and as the motion proceeds the end S' consequently falls and raises thereby the end S allowing the remainder of the bar iron to be introduced. When the end S of the shear is raised the claw e, is locked in one of the teeth of the ratchet wheel and as the motion of the machine proceeds, this ratchet wheel is pushed around by the claw as far as it ranges, and consequently moves the cylinders M, M', thus carrying forward the bar iron in the die of the cylinder M' till it meets a corresponding die on M by which contact and pressure of the two cylinders the form is given to the tail of the spike. At the same time another die arrives in line with P, in readiness to receive the heated bar iron.

The part now undescribed is the heading of the rivets. This is accomplished by a ram or sliding hammer or punch W the striking end of which is concave, working through a cylinder bearing in the frame A, A, similar to a horizontal piston. This sliding hammer is attached to a short connecting rod $l$, by a joint working on a pin. The connecting rod $l$ is propelled backward and forward by an eccentric $M^o$ on the axle K which is turned by the action of the beveled wheels H and J. The direction of the hammer is in line with the dies on the cylinders M, M', when they coincide so that when the form of the tail of the spike is given to the bar iron embraced between the dies of M, M'. The hammer strikes or presses the piece of iron which projects from the end of die and thus forms it into a head at the same time the point is perfecting. The motion of the eccentric withdraws the hammer the revolving of the cylinders separate the dies and the spike falls down, and thus for every successive one; so that while one part of the machine is cutting the heated iron and placing it in the die, the other is forming and heading the rivet.

What I claim as my invention and desire to secure by Letters Patent is

The method of forming or compressing a spike between half dies on the periphery of two cylinders revolving in opposite directions; the axis of the spike being parallel with the axis of the cylinders substantially as herein described, said cylinders being provided with appropriate devices for cutting off, feeding in, and heading the spike.

EDWIN B. WHITE.

Witnesses:
DAVID E. HAPGOOD,
CHAS. O. SHEPARD.